United States Patent
Tanaka et al.

(10) Patent No.: US 7,159,534 B2
(45) Date of Patent: Jan. 9, 2007

(54) DISPLAY UNIT HAVING A CENTER DISPLAY

(75) Inventors: Mitsutoshi Tanaka, Shizuoka (JP); Kengo Komura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 89 days.

(21) Appl. No.: 10/981,707

(22) Filed: Nov. 5, 2004

(65) Prior Publication Data

US 2005/0109261 A1 May 26, 2005

(30) Foreign Application Priority Data

Nov. 25, 2003 (JP) ............................. 2003-393819

(51) Int. Cl.
*G01D 12/22* (2006.01)
*G01P 1/08* (2006.01)

(52) U.S. Cl. .................... 116/300; 116/332; 116/288; 116/DIG. 6; 116/DIG. 36

(58) Field of Classification Search ............... 116/300, 116/304, 332, 62.1, 62.3, 62.4, 284, 286, 116/287, 288, DIG. 6, DIG. 5, DIG. 36, 116/327, 328
See application file for complete search history.

(56) References Cited

U.S. PATENT DOCUMENTS

| 2,123,376 | A | * | 7/1938 | Moeger | 73/866.3 |
|---|---|---|---|---|---|
| 2,158,925 | A | * | 5/1939 | Braswell | 116/62.1 |
| 2,278,520 | A | * | 4/1942 | Pfeffer et al. | 116/332 |
| 2,454,280 | A | * | 11/1948 | Hardesty | 359/437 |
| 3,511,211 | A | * | 5/1970 | Horne et al. | 116/286 |
| 4,194,587 | A | * | 3/1980 | Shino et al. | 180/90 |
| 6,178,917 | B1 | * | 1/2001 | Jansa | 116/286 |
| 6,484,663 | B1 | * | 11/2002 | Zech et al. | 116/284 |
| 6,522,381 | B1 | * | 2/2003 | Brandt | 349/142 |
| 6,601,532 | B1 | * | 8/2003 | Olbrich | 116/288 |
| 6,674,497 | B1 | * | 1/2004 | Brandt | 349/74 |
| 6,682,201 | B1 | * | 1/2004 | Kneer et al. | 362/26 |
| 6,817,310 | B1 | * | 11/2004 | Sugiyama et al. | 116/62.4 |

FOREIGN PATENT DOCUMENTS

| DE | 4321146 A1 | 1/1995 |
|---|---|---|
| FR | 2871230 A1 | * 12/2005 |
| FR | 2871564 A1 | * 12/2005 |
| JP | 2003014508 A | * 1/2003 |

* cited by examiner

*Primary Examiner*—Richard Smith
*Assistant Examiner*—Amy R. Cohen
(74) *Attorney, Agent, or Firm*—Armstrong, Kratz, Quintos, Hanson & Brooks, LLP

(57) ABSTRACT

A dial 21a is positioned in front of an LCD 21c, and has an inner periphery surrounding the LCD 21c. A pointer 21b is rotatable by a drive 21d positioned at a backside of the LCD 21c. The pointer 21b is extended from a rotation center in a direction Y1 against the rotation center along a back surface of the LCD 21c, then bent and extended along an outer periphery of the LCD 21c, and bent and extended in the direction Y2 toward the rotation center via a gap formed between a front surface of the display 21c and a back surface of the dial 21a. Then, the pointer 21b is extended along an inner periphery of the dial 21a, and bent and extended in the direction Y1 along a front surface of the dial 21a.

4 Claims, 3 Drawing Sheets

DISPLAY UNIT HAVING A CENTER DISPLAY

BACKGROUND OF THE INVENTION

The priority application Number Japanese Patent Application 2003-393819 upon which this patent application is based is hereby incorporated by reference.

1. Field of the Invention

This invention relates to a display unit having a display such as an LCD at the center of a dial of a revolution indicator such as a tachometer or a speedometer.

2. Description of the Related Art

As a display unit described above, for example, it is known that a display is arranged in front of a dial of a normal revolution indicator. This arrangement prevents a pointer from obstructing a view of the display, so that the display may be arranged in the center of the dial.

However, in cases where the dial indicates important information such as vehicle speed and the display displays relatively unimportant information such as the present time, there is a demand to improve visibility of the dial by arranging the dial in front of the display.

For meeting this demand, a conventional display unit as shown in FIGS. 5A and 5B is disclosed in German Patent Publication Document DE4321146A1. FIG. 5A is a front view of the conventional display unit. FIG. 5B is a cross-sectional view taken on line III–III' of the conventional display unit in FIG. 5A. As shown in FIGS. 5A and 5B, this display unit includes a display 11 and a dial 12 arranged in front of the display 11. In this dial 12, a substantially arc-shaped slot 12b is provided along graduations 12a.

Further, a drive 14 is provided at a backside of the display 11. This drive 14 rotates a pointer 15. This pointer 15 includes a first pointer part 15a positioned at a backside of the dial 12, and a second pointer part 15b positioned in front of the dial 12. The first and second pointer parts 15a, 15b communicate with each other via the slot 12b provided in the dial 12.

According to the above, when the first pointer part 15a is rotated at the backside of the display 11, the second pointer part 15b is rotated along the slot 12b in front of the dial 12. Therefore, the pointer 15 can indicate the graduations 12a on the dial 12 without obstructing a view of the display 11.

However, in the conventional display unit described above, there is a problem in that the slot 12b should be provided on the dial 12, and reduces an appearance and design quality of the display unit.

Therefore, for solving the problems described above, an object of the present invention is to provide a display unit with high design quality by eliminating the slot provided in the dial, and positioning the dial in front of the display.

SUMMARY OF THE INVENTION

In order to attain the object, according to this invention, there is provided a display unit including:

a display;

a dial positioned in front of the display, and having an inner periphery surrounding the display in front view; and a pointer driven by a drive provided at a backside of the dial, a front part of the pointer being rotatable in front of the dial;

whereby the pointer is extended from an outer periphery of the display in a first direction toward the rotation center of the pointer via a gap formed between a front surface of the display and a back surface of the dial; then bent and extended along the inner periphery of the dial, and then bent and extended in a second direction against the rotation center of the pointer, along a front surface of the dial.

According to the above, a front end of the pointer can indicate graduations on the dial positioned in front of the display without a slot provided on the dial. Therefore, the display attains high design quality.

According to this invention, preferably, there is provided the display unit, wherein the drive is further positioned at the backside of the display, wherein the pointer is extended from the rotation center of the pointer in the second direction against the rotation center of the pointer along a back surface of the display, then bent and extended along the outer periphery of the display, and then bent and extended in the first direction toward the rotation center of the pointer along the gap formed between the front surface of the display and the back surface of the dial.

According to the above, even when the drive is positioned at the backside of the display, the front end of the pointer can indicate the graduations on the dial positioned in front of the display without a slot provided on the dial. Therefore, the display attains high design quality.

According to this invention, preferably, there is provided the display unit, wherein color of an overlapping part of the pointer, overlapping with the display in front view, is seen as being identical with, or similar to color of the display.

According to above, the color of the overlapping part of the pointer, overlapping with the display in front view, is seen as being identical with, or similar to the color of the display. Therefore, in front view, since this overlapping part of the pointer, overlapping with the display is seen as a part of the display and not as a part of the pointer, the pointer is seen as being rotatable only in front of the display.

According to above, in front view, since this overlapping part of the pointer, overlapping with the display is seen as a part of the display and not as a part of the pointer, the pointer is seen as being rotatable only in front of the display. Therefore, the display attains higher design quality.

According to this invention, preferably, there is provided the display unit, wherein color of an overlapping part of the display, overlapping with the pointer in front view, is seen as being identical with, or similar to color of the pointer.

According to above, the color of the overlapping part of the display, overlapping with the dial in front view, is seen as being identical with, or similar to the color of the dial. Therefore, in front view, since this overlapping part of the display, overlapping with the dial is seen as a part of the dial and not as a part of the display, the pointer is seen as being rotatable only in front of the display.

According to above, in front view, since this overlapping part of the display, overlapping with the dial is seen as a part of the dial and not as a part of the display, the pointer is seen as being rotatable only in front of the display. Therefore, the display attains higher design quality.

The above and other objects, features, and advantages of this invention will be better understood when taken in connection with the accompanying drawings and description.

DESCRIPTION OF THE PREFERRED EMBODIMENTS

First Embodiment

Figure 1:
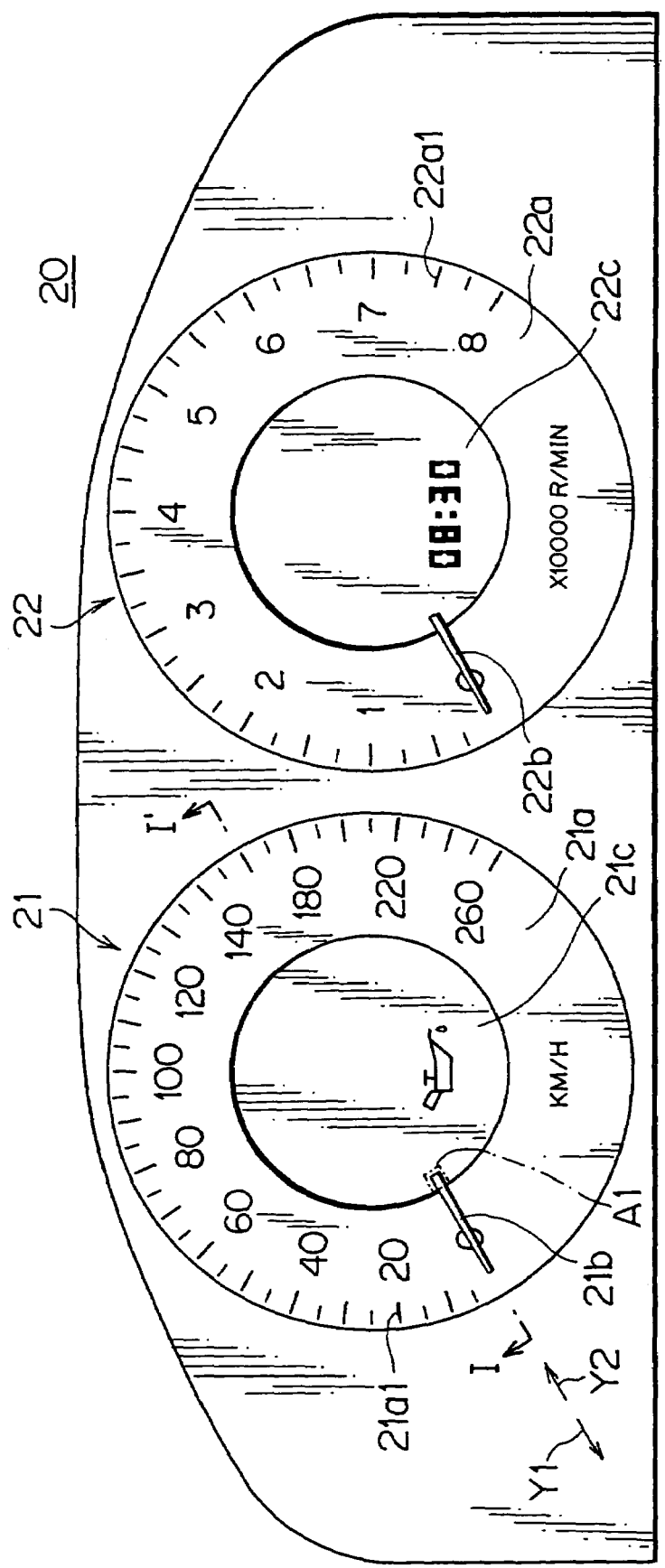
FIG. 1 is a front view showing a first embodiment of a combination meter equipped with a display unit of this invention.
Figure 5A:
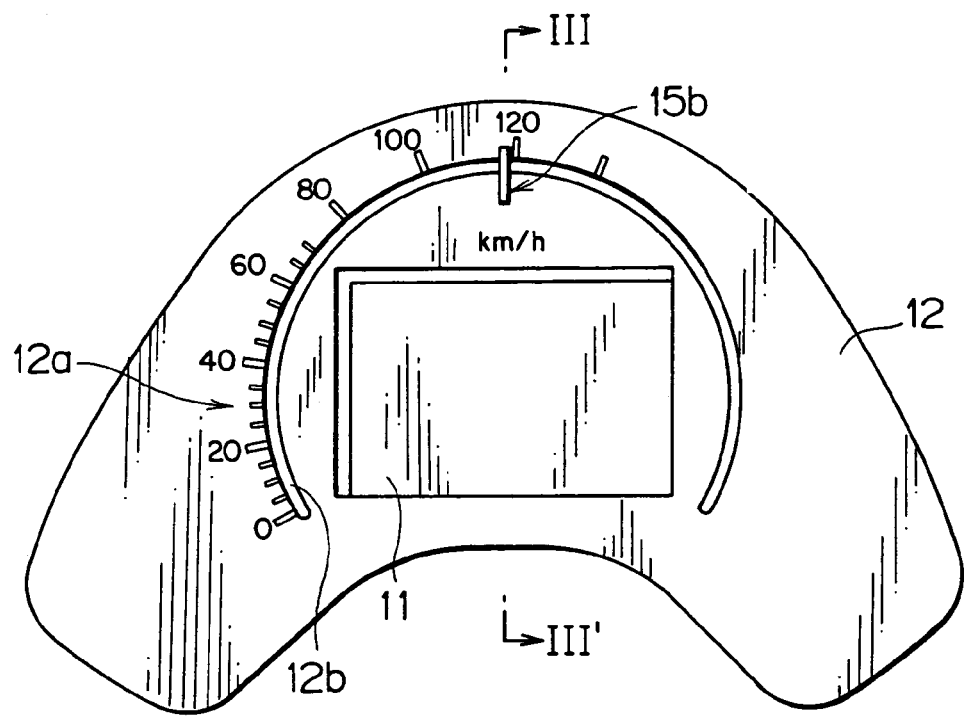
FIG. 5A is a front view showing an embodiment of a conventional display unit.
Figure 5B:
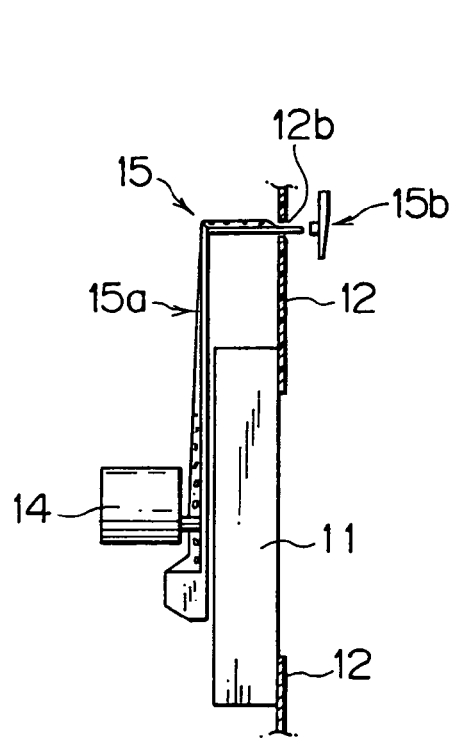
FIG. 5B is a cross-sectional view taken on line III–III' of the display unit in FIG. 5A.
Figure 2:
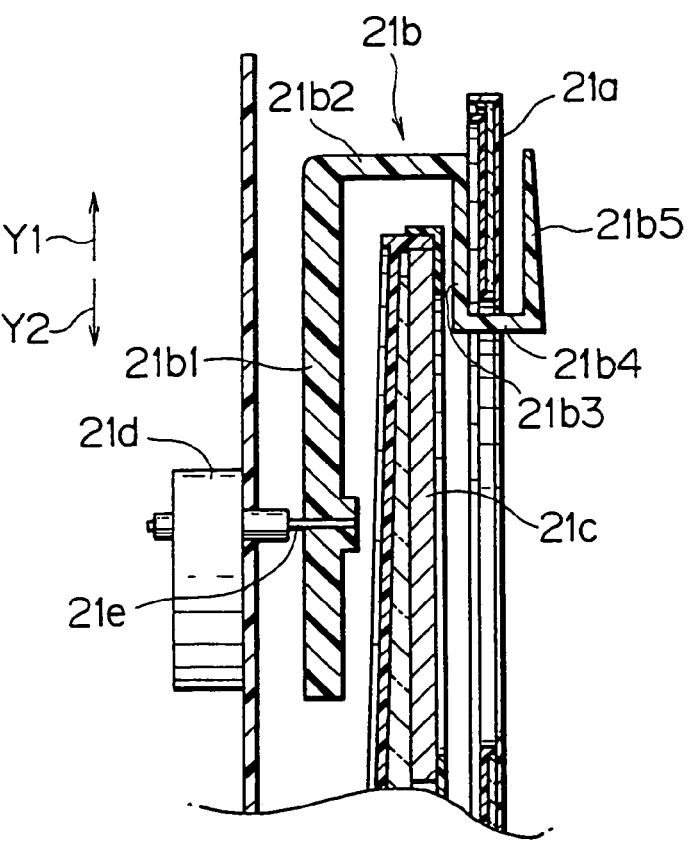
FIG. 2 is a cross-sectional view taken on line I–I' of the combination meter in FIG. 1.

A first embodiment of display units of this invention will be explained with reference to FIGS. 1 to 2. FIG. 1 is a front view showing an embodiment of a combination meter 20 equipped with display units of this invention. FIG. 2 shows a cross-sectional view taken on line I–I' of the combination meter 20 in FIG. 1. As shown in FIG. 1, the display units of this invention is, for example, mounted on the combination meter 20 of a vehicle. The combination meter 20 includes a speedometer 21 and a tachometer 22, as the display units.

As shown in FIG. 1, the speedometer 21 is configured with a dial 21a, a pointer 21b, and a liquid crystal display (LCD) 21c. The dial 21a is formed in a doughnut-like shape in front view, having a substantially circular hole in a middle thereof. Graduations 21a1 are formed along an outer periphery of the dial 21a. The LCD 21c is positioned at a backside of the dial 21a, and can be seen in front view via the hole surrounded by the dial 21a. Namely, an inner periphery of the dial 21a surrounds the LCD 21c.

Warnings such as "oil level low" are displayed on the LCD 21c. In front view, no gap is seen in between the inner periphery of the dial 21a and an outer periphery of the LCD 21c, so that the hole surrounded by the dial 21a is seen as overlapping with the LCD 21c.

Similarly, the tachometer 22 is also configured with a dial 22a, a pointer 22b, an LCD 22c. The dial 22a is formed in a doughnut-like shape, having a substantially circular hole in a middle thereof. Graduations 22a1 are formed along an outer periphery of the dial 22a. The LCD 22c is positioned at a backside of the dial 22a, and can be seen in front view via the hole surrounded by the dial 22a. Namely, an inner periphery of the dial 22a surrounds the LCD 22c.

Information, such as current time or room temperature, is displayed on the LCD 22c. In front view, no gap is seen in between the inner periphery of the dial 22a and an outer periphery of the LCD 22c, so that the hole surrounded by the dial 22a is seen as overlapping with the LCD 22c.

Next, a configuration of the speedometer 21 will be explained in detail with reference to a cross-sectional view of FIG. 2. As shown in FIG. 2, the speedometer 21 further includes a drive 21d positioned at a backside of the LCD 21c, and a rotation axis 21e being rotatable by the drive 21d.

The pointer 21b is configured with first to fifth pointer parts (21b1 to 21b5). The first pointer part 21b1 is extended from the rotation axis 21e, along a back surface of the LCD 21c, in a direction Y1 against a rotation center of the axis 21e. The second pointer part 21b2 is extended from an end of the first pointer part 21b1, along a side surface of the outer periphery of the LCD 21c, toward a front side of the LCD 21c.

The third pointer part 21b3 is extended from an end of the second pointer part 21b2, via a gap between a front surface of the LCD 21c and a rear surface of the dial 21a, in a direction Y2 toward the rotation center. The fourth pointer part 21b4 is extended from an end of the third pointer part 21b3, along a side surface of the inner periphery of the dial 21a, toward a front surface of the dial 21a. The fifth pointer part 21b5 is extended from an end of the fourth pointer part 21b4, along a front surface of the dial 21a, toward the graduations 21a1 (FIG. 1). Namely, the pointer 21b has a substantially S-shape, bent in the direction Y2 at a gap between the dial 21a and the LCD 21c, and bent back in the direction Y1 along a front surface of the dial 21a.

According to the above, the pointer 21b is extended from the drive 21d, along the back surface of the LCD 21c, in the direction Y1 against the rotation center. When crossing the outer periphery of the LCD 21c, the pointer 21b is extended via the gap between the front surface of the LCD 21c and the back surface of the dial 21a in the direction Y2 toward the rotation center. When crossing the inner periphery of the dial 21a, the pointer 21b is extended in the direction Y1. Thereby, when the drive 21d is positioned at the backside of the LCD 21c, a front end of the pointer 21b indicates the graduations 21a1 (shown in FIG. 1) provided on the front surface of the dial 21a, without a slot provided on the dial 21a. Therefore, the design quality of the display unit is improved.

Since a configuration of the tachometer 22 is similar to that of the speedometer 21, a detailed explanation of the configuration will be omitted. In addition, in this embodiment, the dials 21a, 22a surround the whole LCDs 21c, 22c respectively. However, the dials 21a, 22a may respectively surround a part (not the whole) of the LCDs 21c, 22c.

Further, in this embodiment, the pointer 21b is extended from the rotation axis 21e being rotatable by the drive 21d provided at the backside of the LCD 21c. However, for example, the pointer 21b may be extended from a ring gear (not shown), which surrounds the LCD 21c at the backside of the dial 21a, and is rotatable by the drive 21d.

In this case, the pointers 21b, 22b are extended from the ring gears (not shown) in the direction Y2 toward the rotation centers via the gap between the front surfaces of the LCDs 21c, 22c and the dials 21a, 22a. When crossing the inner peripheries of the dials 21a, 22a, the pointers 21b, 22b are extended along front surfaces of the dials 21a, 22a in the direction Y1.

In the first embodiment, the pointer 21b is extended via the gap between the front surface of the LCD 21c and the backside of the dial 21a in the direction Y2 toward the rotation center. When crossing the inner periphery of the dial 21a, the pointer is extended in the direction Y1 against the rotation center. However, as shown in FIG. 1, the shape of the pointer 21b as above described causes an overlapping part A1 where the pointer 21b overlaps with the LCD 21c.

Resultingly, when applying the pointer 21b having the above described shape to such a combination of the dial 21a and the LCD 21c that colors of the dial 21a and the LCD 21c are different from each other; a boundary between them is plainly visible; and colors between the pointer 21b and the LCD 21c are different from each other, a projecting end of the pointer 21b, projecting in the direction Y2 toward the rotation center, is plainly visible.

Second Embodiment

Figure 3:
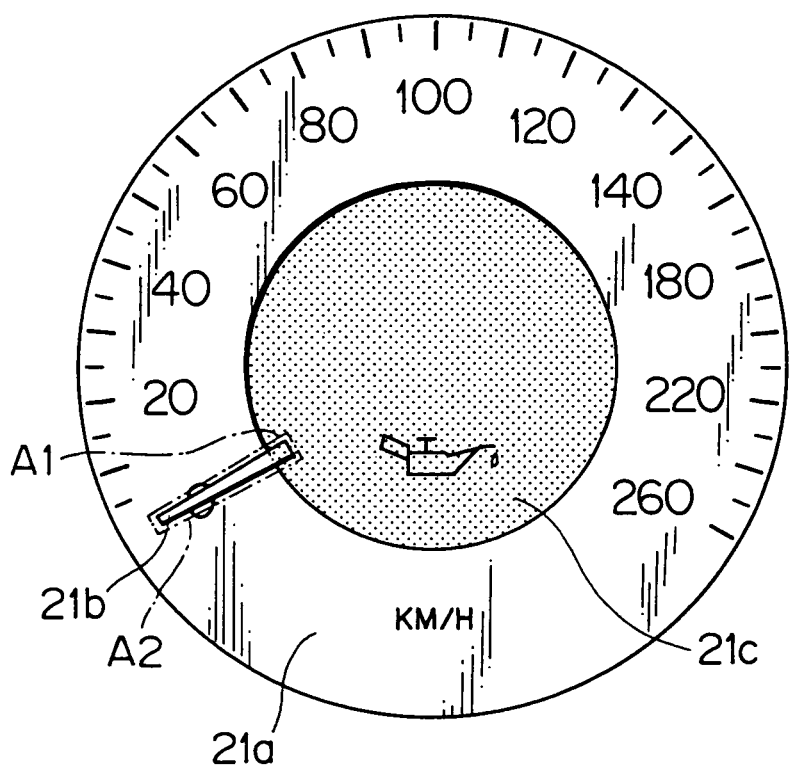
FIG. 3 is a front view showing a speedometer as a second embodiment of the display unit of this invention.

In order to improve an appearance of the display unit, as shown in FIG. 3, according to a second embodiment of this invention, color of the projecting end A1 of the pointer 21b, overlapping with the LCD 21c, may be set to identical with, or similar to the color of the LCD 21*c*. For example, when the colors of the dial 21*a*, the LCD 21*c*, and the pointer 21*b* are respectively white, dark color, and blue, the color of A1 of the pointer 21*b* is set to the dark color (the same color as that of the LCD 21*c*), and the color of an overlapping part A2, overlapping with the dial 21*a*, is set to blue. Thereby, the projecting end A1 of the pointer 21*b* is not seen as a part of the pointer 21*b* in front view, and is seen as a part of the LCD 21*c*. Therefore, the pointer 21*b* is seen as only being rotatable on a front surface of the dial 21*a*, and the design quality of the display unit is improved.

Third Embodiment

Figure 4:
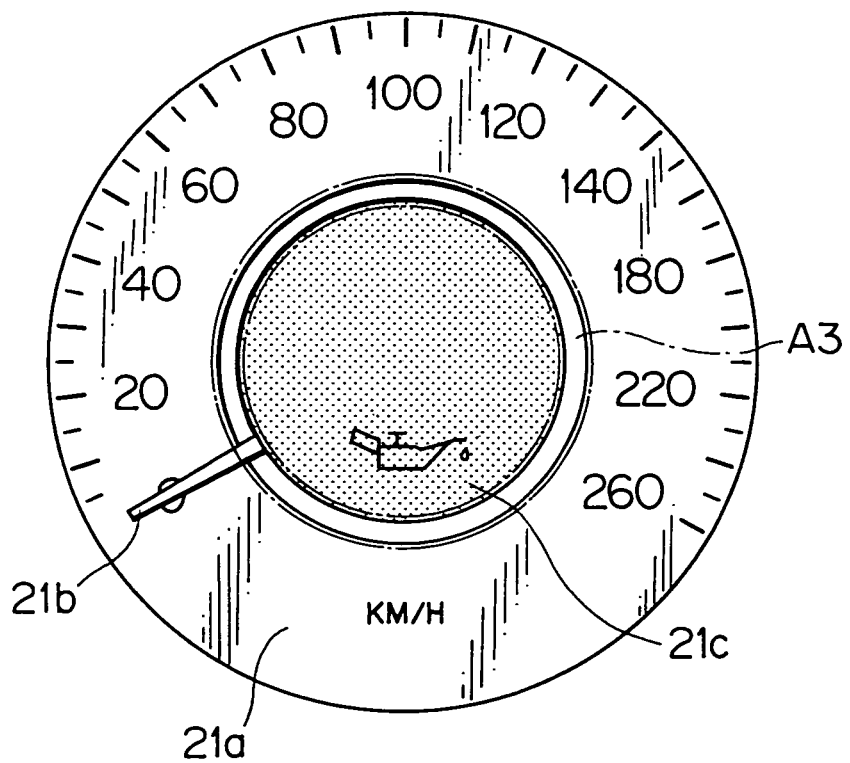
FIG. 4 is a front view showing a speedometer as a third embodiment of the display unit of this invention.

Alternatively, as shown in FIG. 4, in front view, an overlapping part of the LCD 21*c*, overlapping with the pointer 21*b*, may be set to identical with, or similar to the color of the dial 21*a*. Specifically, when the colors of the dial 21*a*, the LCD 21*c*, and the pointer 21*b* are respectively white, dark color, and blue, the color of an overlapping part A3 of the LCD 21*c* is set to white (the same color as that of the dial 21*a*). Thereby, the overlapping part A3 of the LCD 21*c* is not seen as a part of the LCD 21*c* in front view, and is seen as a part of the dial 21*a*. Therefore, the pointer 21*b* is seen as only being rotatable on a front surface of the dial 21*a*, and the design quality of the display unit is improved. Further, if the overlapping part A3 of the LCD 21*c* is made of the same material as that of the dial 21*a*, the overlapping part will be seen as the part of the dial 21*a* more naturally.

The same configuration in the dial 21*a* is applied to the dial 22*a* and therefore explanation concerning the dial 22*a* has been omitted for brevity.

Having now fully described the invention, it will be apparent to one of ordinary skill in the art that many changes and modifications can be made thereto without departing from the (spirit and) scope of the invention as set forth herein.

What is claimed is:

1. A display unit comprising:

a display a dial positioned in front of the display having graduations found along an outer periphery thereof, and an inner periphery surrounding the display in front view, with a gap found between a front surface of the display and a rear surface of the dial; and a pointer driven by a drive provided at a backside of the dial, a front part of said pointer being rotatable in front of the dial, the pointer having a first pointer part extending from a rotation axis along a back surface of the display, a second part extending from an end of the first part along a side surface of an outer periphery of the display toward a front side of the display, a third part extending from an end of the second part via said gap between the front surface of the display and the rear surface of the dial, in a direction toward the rotation axis, a fourth part extending from an end of the third part along a side surface of an inner periphery of the dial toward a front surface of the dial, and a fifth part extending from an end of the fourth part along a front surface of the dial toward the graduations and the rotation axis.

2. The display unit as claimed in claim 1, wherein the drive is further positioned at the backside of the display.

3. The display unit as claimed in claim 1 or 2, wherein color of an overlapping part of the pointer, overlapping with the display in front view, is seen as being identical with, or similar to color of the display.

4. The display unit as claimed in claim 1 or 2, wherein color of an overlapping part of the display, overlapping with the pointer in front view, is seen as being identical with, or similar to color of the dial.

* * * * *